(12) United States Patent
Lee et al.

(10) Patent No.: US 7,565,050 B2
(45) Date of Patent: Jul. 21, 2009

(54) LIGHT PIPE HAVING AN IMPROVED STRUCTURE OF PRISMS

(75) Inventors: Sang Hoon Lee, Chungcheongbuk-do (KR); Han Kyu Cho, Chungcheongbuk-do (KR); Jong-Jin Kim, Chungcheongbuk-do (KR)

(73) Assignee: LG Electronics, Inc., Seoul (KR)

( * ) Notice: Subject to any disclaimer, the term of this patent is extended or adjusted under 35 U.S.C. 154(b) by 0 days.

(21) Appl. No.: 11/759,648

(22) Filed: Jun. 7, 2007

(65) Prior Publication Data

US 2008/0089654 A1 Apr. 17, 2008

(30) Foreign Application Priority Data

Oct. 13, 2006 (KR) .................. 10-2006-0099783
Dec. 1, 2006 (KR) .................. 10-2006-0120553

(51) Int. Cl.
*G02B 6/00* (2006.01)
*G02B 6/34* (2006.01)
*G02B 6/02* (2006.01)
*G09F 13/00* (2006.01)
*F21V 11/00* (2006.01)
*G09F 13/18* (2006.01)

(52) U.S. Cl. .................. 385/133; 385/36; 385/123; 385/125; 385/126; 385/127; 385/128; 385/147; 385/900; 385/901; 362/551; 362/558; 362/559; 362/560

(58) Field of Classification Search .................. 385/36, 385/123, 125–128, 147, 900, 901; 362/551, 362/568–560
See application file for complete search history.

(56) References Cited

U.S. PATENT DOCUMENTS

| 4,422,719 | A | | 12/1983 | Orcutt |
| 4,805,984 | A | * | 2/1989 | Cobb, Jr. .................. 385/133 |
| 4,989,933 | A | | 2/1991 | Duguay et al. |
| 4,996,632 | A | * | 2/1991 | Aikens .................. 362/560 |
| 5,109,465 | A | * | 4/1992 | Klopotek .................. 385/133 |
| 5,219,217 | A | | 6/1993 | Aikens |
| 5,481,637 | A | | 1/1996 | Whitehead |
| 5,662,403 | A | * | 9/1997 | Akashi et al. .................. 362/558 |
| 5,745,632 | A | * | 4/1998 | Dreyer .................. 385/133 |
| 6,031,958 | A | | 2/2000 | McGaffigan |
| 6,337,946 | B1 | | 1/2002 | McGaffigan |

(Continued)

FOREIGN PATENT DOCUMENTS

CN 1451099 A 10/2003

(Continued)

*Primary Examiner*—Brian M. Healy
*Assistant Examiner*—Hung Lam
(74) *Attorney, Agent, or Firm*—Birch, Stewart, Kolasch & Birch, LLP

(57) ABSTRACT

The present invention is directed to a light pipe having an improved structure of prisms. According to one embodiment of the present invention, a hollow light pipe comprises an inner-surface including a linear array of prisms; and a substantially smooth outer-surface, wherein a pitch of prisms in a first region is wider than a pitch of prisms in a second region. According to another embodiment of the present invention, a hollow light pipe comprises a hollow base pipe; and an insertion inserted into the base pipe and having a structured surface including an array of prisms, wherein a pitch of prisms in a first region is wider than a pitch of prisms in a second region.

22 Claims, 9 Drawing Sheets

U.S. PATENT DOCUMENTS

| | | | |
|---|---|---|---|
| 6,382,811 B1 | 5/2002 | Bernard | |
| 6,481,882 B1 * | 11/2002 | Pojar | 362/559 |
| 6,533,446 B2 | 3/2003 | Chen et al. | |
| 6,621,973 B1 * | 9/2003 | Hoffman | 385/133 |
| 6,714,711 B1 | 3/2004 | Lieberman et al. | |
| 2001/0040799 A1 * | 11/2001 | Munro et al. | 362/26 |
| 2003/0026585 A1 | 2/2003 | Iimura | |
| 2003/0117790 A1 | 6/2003 | Lee et al. | |
| 2004/0263793 A1 | 12/2004 | Kim et al. | |
| 2006/0152931 A1 | 7/2006 | Holman | |

FOREIGN PATENT DOCUMENTS

| | | |
|---|---|---|
| EP | 0 615 220 A1 | 9/1994 |
| EP | 1 180 640 A1 | 2/2002 |
| JP | 56135821 | 10/1981 |
| JP | 2002-237203 | 8/2002 |
| KR | 10-2001-0113640 A | 12/2001 |
| KR | 2004-0082167 | 9/2004 |
| KR | 10-2005-0022041 A | 3/2005 |
| KR | 10-2006-0064369 A | 6/2006 |
| WO | WO-96/14597 A1 | 5/1996 |
| WO | WO-01/71396 A1 | 9/2001 |

* cited by examiner

— Light in the air
------ Light in the optical lighting film

— Light in the air
------ Light in the optical lighting film

LIGHT PIPE HAVING AN IMPROVED STRUCTURE OF PRISMS

CROSS-REFERENCE TO A RELATED APPLICATION

The present application claims the benefit of priority under 35 U.S.C. 119 based on the Korean Patent Application Nos. 10-2006-0099783 filed on Oct. 13, 2006 and 10-2006-0120553 filed on Dec. 1, 2006. These applications are incorporated herein by references.

BACKGROUND

1. Field

The present invention is directed to a light pipe having an improved structure of prisms.

2. Background

An illuminating apparatus using a light pipe by which a light can be transmitted to far distance with relatively small transmission loss is known in the art. The light pipe is also called as a light conduit, an optical guide, or a light tube, and is used for effectively distributing a decorative or functional light over a relatively large area.

Below, the principles of light transmission and reflection of the light pipe having the above construction will be explained in the scope necessary to understand the present invention with reference to the drawings.

FIG. 1a is a cross-sectional view illustrating part of an optical lighting film for describing transmission and reflection in a light pipe used in illuminating system in the art. And, FIG. 1b is a perspective view illustrating part of an optical lighting film for describing transmission and reflection in a light pipe used in illuminating system in the art.

Referring to FIG. 1a and FIG. 1b, a light from a light source (not shown) is incident and refracted to an unstructured inner side of the optical lighting film (point 1), total-reflected on both sides of a prism of the structured outer side (point 2 and point 3), whereby the light proceeding to outside is refracted at the inner side (point 4), and is inputted again to inside, as shown by the arrow. As this total-reflection process is repeated, the light is substantially proceeding along with the longitudinal direction of the light pipe. Thus, the transmission ability of a light generated from the light source can be enhanced by using the optical lighting film.

The conventional light pipe like the above improves the transmission ability of a light generated from a light source by using the optical lighting film, but it was difficult to emit the light mote toward a certain direction.

BRIEF DESCRIPTION OF THE DRAWINGS

The embodiments will be described in detail with reference to the following drawings in which like reference numerals refer to like elements wherein:

FIG. 4 is an enlarged partial cross sectional view illustrating the area C of FIG. 3a;

DETAILED DESCRIPTION OF THE INVENTION

One object of the present invention is to provide a light pipe that has an improved structure of prisms and is capable of emitting a light more toward a certain direction.

Further scope of applicability of die present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

In the following drawings, same reference numbers will be used to refer to the same or similar parts through all embodiments. In addition, the detailed descriptions of the identical parts are not repeated.

Figure 1A:
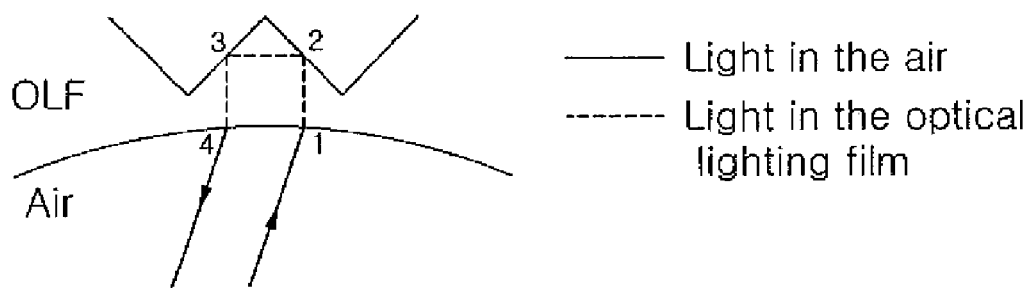
FIG. 1a is a cross-sectional view illustrating part of an optical lighting film for describing transmission and reflection in a light pipe used in illuminating system in the art.
Figure 1B:
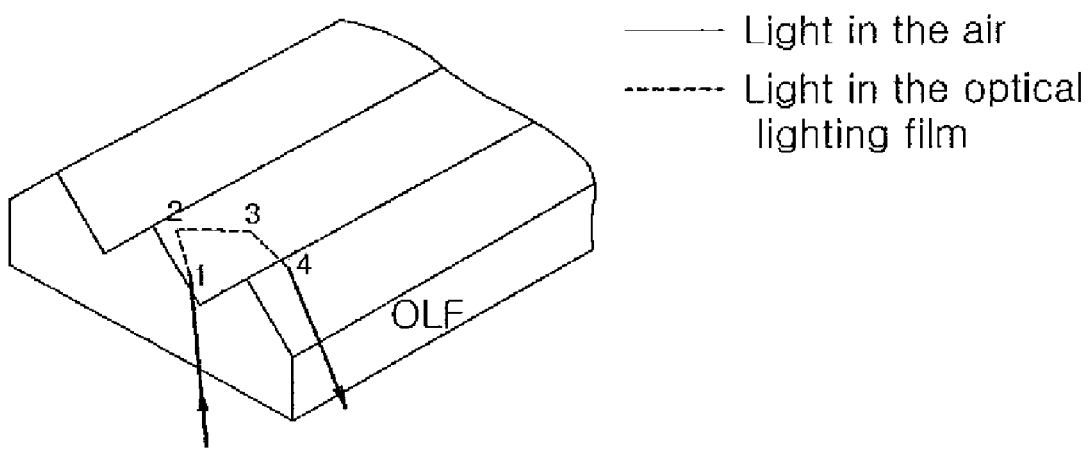
FIG. 1b is a perspective view illustrating part of an optical lighting film for describing transmission and reflection in a light pipe used in illuminating system in the art.
Figure 2:
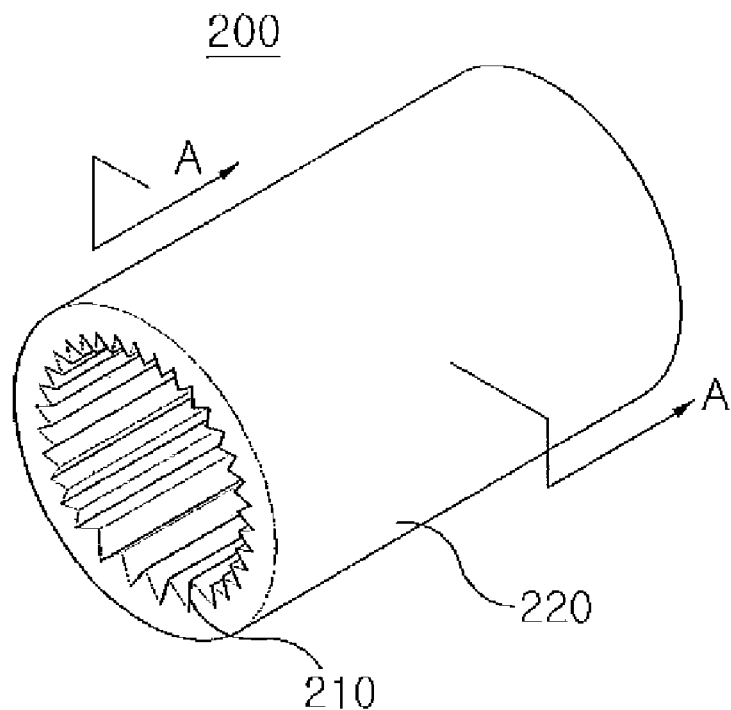
FIG. 2 is a perspective view illustrating a hollow light pipe according to one embodiment of the present invention.
Figure 3A:
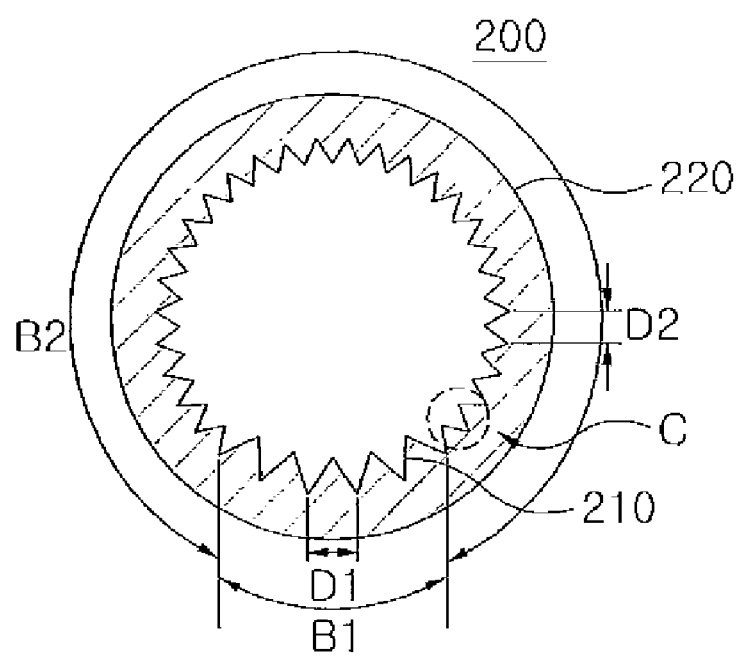
FIG. 3a is a cross-sectional view of a hollow light pipe of FIG. 2 taken along the line A-A.

FIG. 2 is a perspective view illustrating a hollow light pipe according to one embodiment of the present invention; and FIG. 3a is a cross-sectional view of a hollow light pipe of FIG. 2 taken along the line A-A.

Referring to FIGS. 2 and 3a, a light pipe 200 of the present invention comprises a substantially smooth outer-surface 220, and an inner surface 210 including a linear array of prisms.

Hereinafter, the term, 'pitch' is defined as a distance between valleys of prism.

The pitch D1 of prisms in a first region B1 is wider than a pitch D2 of prisms in a second region B2. Therefore, the first region B1 emits a large amount of the light.

According to one embodiment of the present invention, the pitch D1 of the prisms in the first region B1 is in the range of about 1.5 mm to 2.5 mm, and the pitch D2 of prisms in the second region B2 is in the range of about 0.5 mm to 1.5 mm. Preferably, the pitch D1 of prisms in the first region B1 is about 1.7 mm to 2.2 mm, and the pitch D2 of prisms in the second region B2 is about 0.8 mm to 1.3 mm.

The light pipe 200 may be made up of transparent materials which transmit the light well, for example, a polymer which includes at least one of polycarbonate (PC), polymethyl methacrylate (PMMA), acryle, polypropylene, polystyrene, and polyvinyl chloride.

FIGS. 3b to 3e are cross-sectional view illustrating hollow light pipes according to another embodiment of the present invention.

Referring to 3b, a light pipe 300A of the present invention comprises substantially smooth outer-surface 320A, 320B, 320C, 320D, 320E and 320F.

An inner-surface 310A, 310B, 310C, 310D, 31DE and 310F substantially has a cross-section of hexahedron-shape, and each surface is structured with prisms.

The pitch of one surface 310A in the hexahedron is wider than the pitch of the other surfaces 310B, 310C, 310D, 310E and 310F in the hexahedron. Therefore, a certain outer-surface 320A emits a large amount of the light.

Figure 3B:
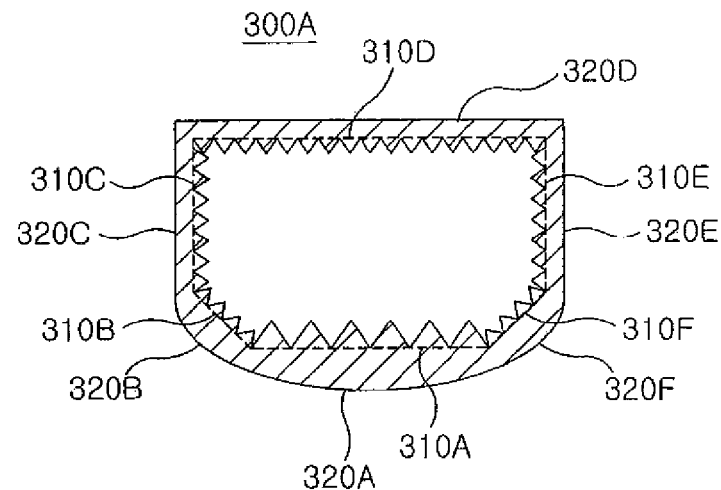
FIGS. 3b to 3e are cross-sectional view illustrating hollow light pipes according to another embodiment of the present invention.

In FIG. 3b, an inner-surface 310A, 310B, 310C, 310D, 310E and 310F of the light pipe 300A substantially has a cross-section of hexahedron shape, and each surface is structured with prisms, however, the idea of the present invention is not limited to such shape, for example, the inner surface of the light pipe may have a cross-section of a polyhedron-shape, and, each surface may be structured with prisms.

Figure 3C:
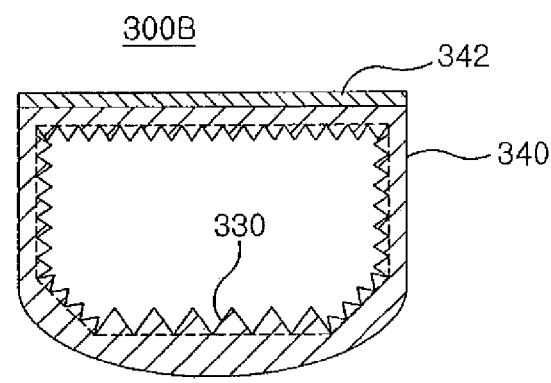
Figure 3D:
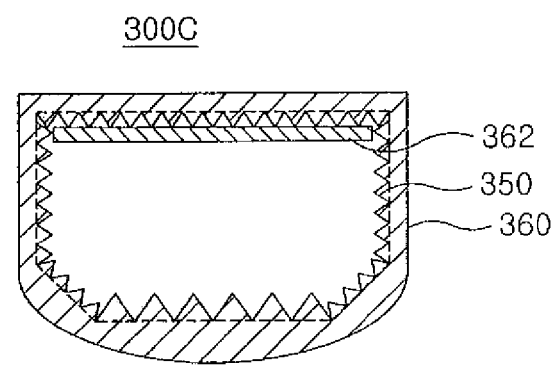
Figure 3E:
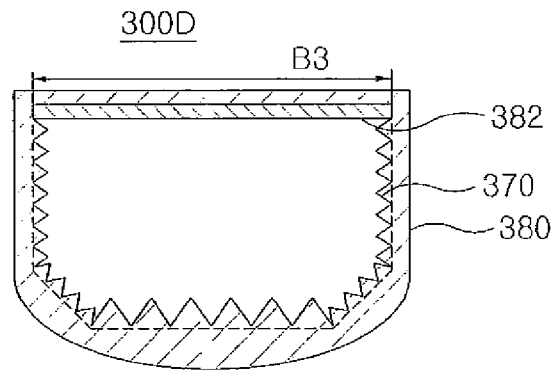

Referring to FIGS. 3c to 3e, a hollow light pipe 300B, 300C and 300D of the present invention comprises a substantially smooth outer-surface 340, 360 and 380, and an inner-surface 330, 350 and 370 including a linear array of prisms.

Here, a reflector 342, 362 and 382 reflecting a light is disposed inside or outside the hollow light pipe 300B, 300C and 300D, and faces the first region B1.

In FIG. 3c, the reflector 342 is disposed on the outer-surface 340 of the light pipe 300B, and in FIG. 3d, the reflector 362 is disposed on the inner-surface 350 of the light pipe 300C.

In FIG. 3e, the reflector 382 is disposed on a third region B3 having a smooth surface.

The reflector 342, 362 and 382 reflects the light transmitted in the light pipe 300B, 300C and 300D.

Therefore, in case the reflector 342, 362 and 382 is disposed in a certain region of the light pipe 300B, 300C and 300D, it prevents outputting a light through the certain region, and the other region emits a large amount of the light.

The reflector 342, 362 and 382 is made up a material having high reflexibility, for example, the reflector may be manufactured by applying Al or Ag on a sheet made of SUS, Brass, Al, PET, etc.

Figure 4:
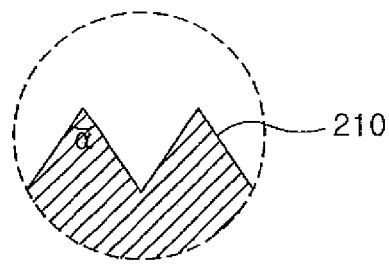

FIG. 4 is an enlarged partial cross-sectional view illustrating the area C of FIG. 3a.

Referring to FIG. 4, an edge angle α of inner direction of prisms may be below 180°. In case the edge angle α of inner direction of prisms is an acute angle, the effect of total reflection of a light transmitted in the light pipe 200 can be enhanced.

Figure 5:
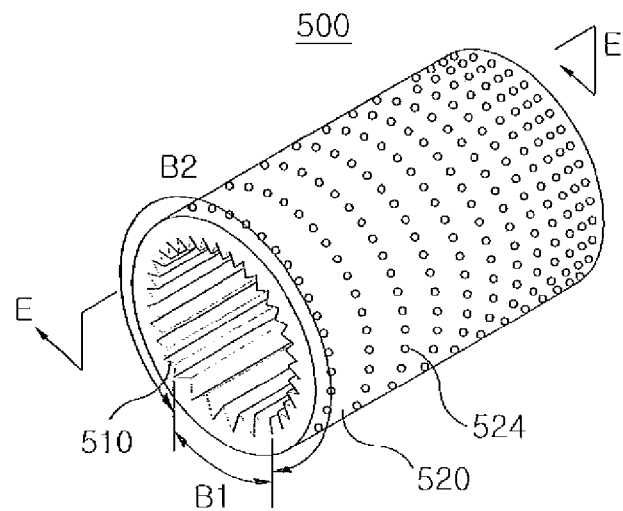
FIG. 5 is a perspective view illustrating a hollow light pipe according to further another embodiment of the present invention.

FIG. 5 is a perspective view illustrating a hollow light pipe according to further another embodiment of the present invention.

Referring to FIG. 5, a light pipe 500 of the present invention comprises a substantially smooth outer-surface 520, and an inner surface 510 including a linear array of prisms.

The pitch of prisms in a first region B1 is wider than a pitch of prisms in a second region B2.

Also, a scattering pattern 524 is formed on the outer-surface 520 by adhering diffusive particles or disposing a film having a scattering pattern. The more scattering pattern 524 is formed, the more amount of light is scattered.

The diffusive particles are adhered to at least some region of the outer-surface 520, and the diffusive particles may be beads.

The film having scattering pattern is disposed on the outer-surface of the light pipe 410.

According to one embodiment, the film having scattering pattern is manufactured by printing white dots on one or both surfaces of a base film.

According to another embodiment, the film having scattering pattern is manufactured by printing colored dots or dyed colored dots except white dots on one surface or both surfaces of a base film.

And, the film is disposed at outside the light pipe 500 in roll shape by bonding one edge and the other edge of the film.

In order to bond one edge and the other edge of the film, a taping or sealing method well known in the art may be used.

In the bonding process, in case one edge plane and the other edge plane are overlapped, a light breaking phenomenon and an excess light emitting phenomenon through the overlapped planes may be occurred. Thus, an attention is required in the taping or sealing.

The film is made up of transparent materials, preferably, homogeneous and isotropic materials, for example, acryl or polycarbonate.

Also, the film should be flexible enough to be a roll shape. Here, the flexibility is relevant to the thickness of the film. Thus, considering the diameter of the light pipe 500, etc., a proper thickness should be selected.

Figure 6:
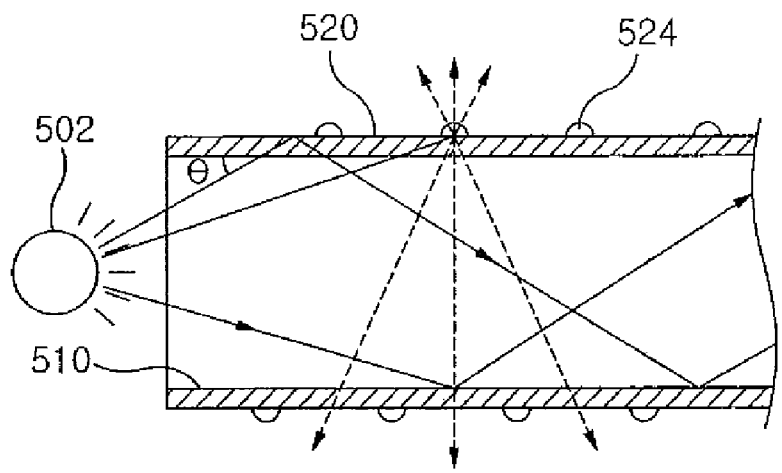
FIG. 6 is a partial cross sectional view of a hollow light pipe of FIG. 5 taken along the line E-E.

FIG. 6 is a partial cross-sectional view of a hollow light pipe of FIG. 5 taken along the line F-F.

Referring to FIG. 6, a light source 502 provides a light inside a light pipe 500.

In case the light inputted to inside the light pipe 500 has an incident angle below a critical angle θ which is determined by the ratio of refractive index between the light pipe 500 and a medium around the light pipe 500, the light is reflected by total reflection condition of the Snell's law well known in the art, whereby the light progressing to outside the light pipe 500 is confined inside the light pipe 500 so that the light is transmitted substantially to the longitudinal direction of the light pipe 500.

The light inputted to inside the light pipe 500 has an incident angle above a critical angle θ is discharged directly to the outer surface 520 of the light pipe 500. Here, if the light discharged from the outer surface 520 is transmitted to the scattering pattern 524, the light is scattered.

As shown above, the light inputted to inside the light pipe 500 is transmitted substantially to the longitudinal direction of the light pipe 500, and some of light is discharged to outside the light pipe 500.

Figure 7:
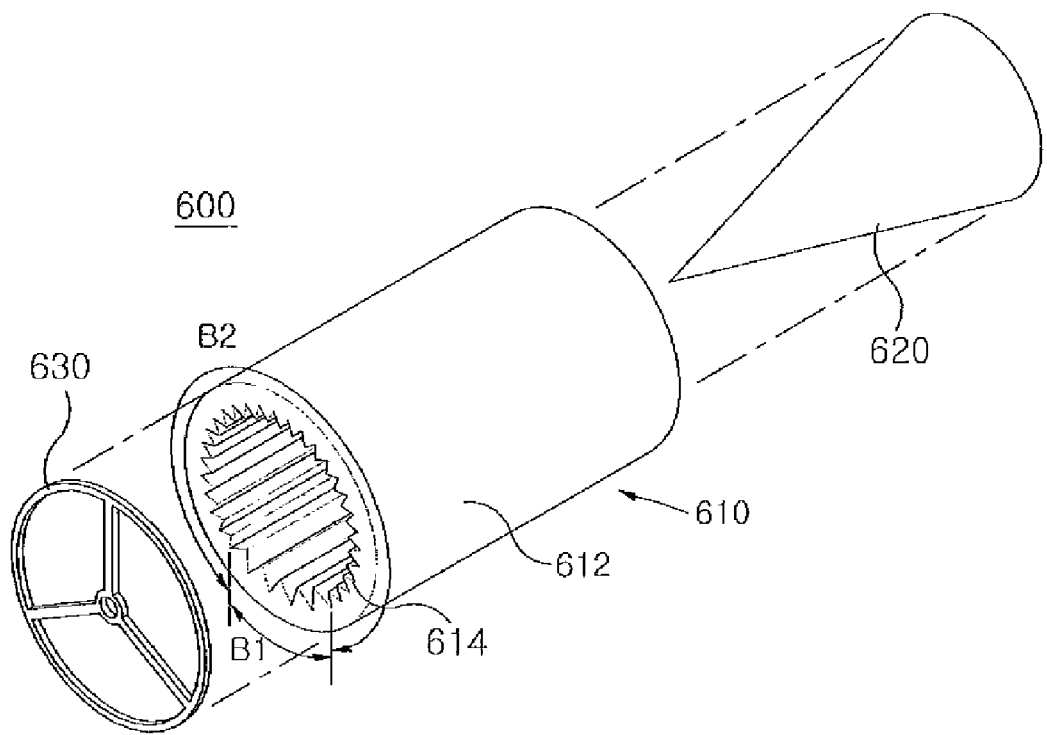
FIG. 7 is an exploded perspective view illustrating a hollow light pipe according to further another embodiment of the present invention.

FIG. 7 is an exploded perspective view illustrating a hollow light pipe according to further another embodiment of the present invention.

Referring to FIG. 7, a light pipe 600 comprises a base pipe 610 and a cone-shaped extractor 620. The light pipe 600 may further comprise a supporting body 630 which is connected to an edge part of the cone-shaped extractor 620.

The base pipe 610 of the present invention comprises a substantially smooth outer-surface 612, and an inner surface 614 including a linear array of prisms.

The pitch of prisms in a first region B1 is wider than a pitch of prisms in a second region B2. Therefore, the first region B1 emits a large amount of the light.

According to one embodiment of the present invention, the pitch of the prisms in the first region B1 is in the range of about 1.5 mm to 2.5 mm, and the pitch of prisms in the second region B2 is in the range of about 0.5 mm to 1.5 mm. Preferably, the pitch of prisms in the first region B1 is about 1.7 mm to 2.2 mm, and the pitch of prisms in the second region B2 is about 0.8 mm to 1.3 mm.

The base pipe 610 may be made up of transparent materials which transmit the light well, for example, a polymer which includes at least one of polycarbonate (PC), polymethyl methacrylate (PMMA), acryle, polypropylene, polystyrene, and polyvinyl chloride.

The cone-shaped extractor 620 is inserted to inside the base pipe 610, and reflects the light. The length of the extractor 620 may be same as or shorter than that of the base pipe 610.

The extractor 620 may be manufactured by applying Ag on a sheet made of SUS, Brass, Al, PET, etc., and coating it with Ti to prevent the thermal deterioration caused by heat absorption.

Alternatively, the extractor 620 may be obtained by dispersing micro-pores capable of scattering light in a resin sheet such as PET. Thus prepared sheet may be used as the extractor by inserting the sheet rolled as cone shape to inside the base pipe 610.

Figure 8A:
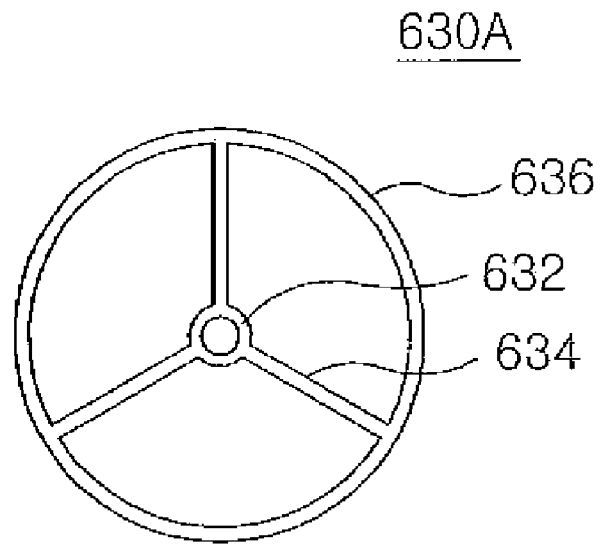
FIG. 8a is a front view illustrating the supporting body in FIG. 7.
Figure 8B:
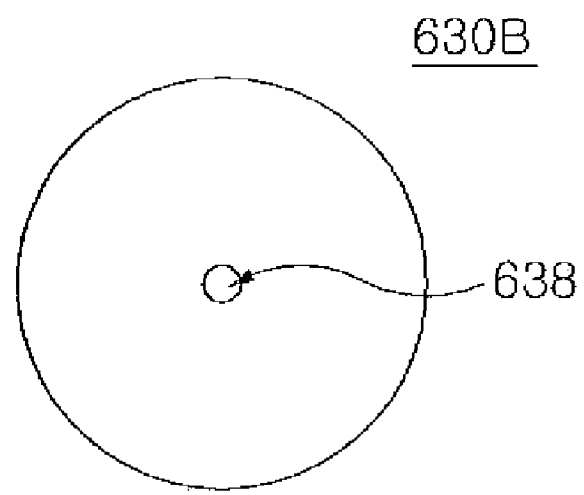
FIG. 8b is a front view illustrating the supporting body according to another embodiment of the present invention.

FIG. 8a is a front view illustrating the supporting body in FIG. 7; and FIG. 8b is a front view illustrating the supporting body according to another embodiment of the present invention.

Referring to FIG. 8a, the supporting body 630A comprises connecting part 632, supporting part 634, and base part 636.

The connecting part 632 is connected to an edge part of the cone-shaped extractor 620; and the supporting part 634 and the base part 636 distribute the weight of the cone-shaped extractor 620 connected to the connecting part 632.

According to one embodiment, the supporting body 630A is combined with one end of the base pipe 610 close to the edge part of the cone-shaped extractor 620 of the base pipe 610. According to another embodiment, the length of the cone-shaped extractor 620 is shorter than that of the base pipe 610, and the supporting body 630 is connected to the edge part of the cone-shaped extractor 620 inside the base pipe 610.

The supporting body 630 may be made up of transparent materials not to interrupt the transmission course of the light and thin metals.

Referring to FIG. 8b, the supporting body 630B is formed as a circular plate having an opening 638. The edge part of the cone shaped extractor 620 is connected to the opening 638, and the extractor 620 is disposed at inside the base pipe 610.

According to one embodiment, the supporting body 630B may be made of a polymer which includes at least one of polycarbonate (PC), polymethyl methacrylate (PMMA), acryl, polypropylene, polystyrene and polyvinyl chloride.

The supporting body 630B may be combined to one end of the base pipe 610 or inside thereof. In case the supporting body 630B is combined to inside the base pipe 610, an edge of the circular plate may be modified to correspond to a structured inner surface 614 of the base pipe 610.

The shape of the supporting body 630A and 630B is not limited to the above, and any constitution is possible as long as it can support the extractor 620, insert the extractor 620 to inside the base pipe 610, and minimize interruption of transmission of the light.

Figure 9:
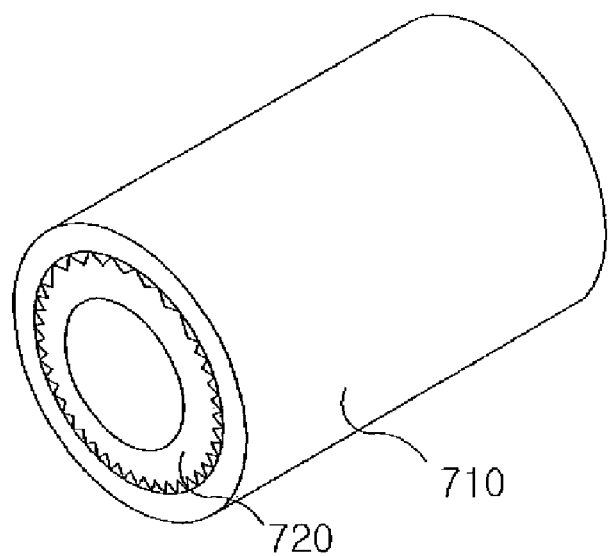
FIG. 9 is a perspective view illustrating a hollow light pipe according to further another embodiment of the present invention.
Figure 10:
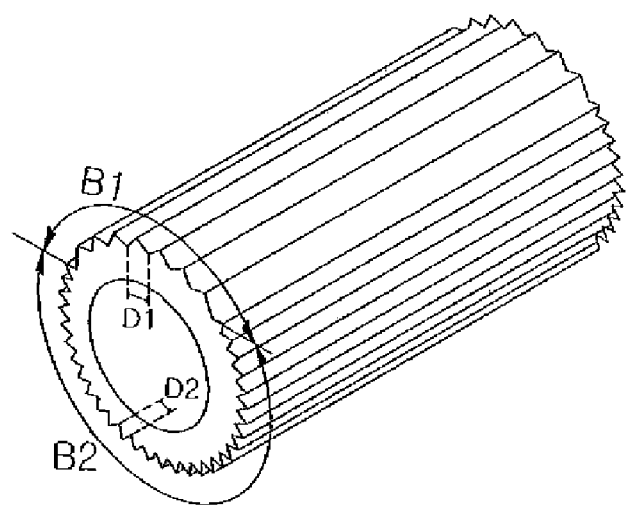
FIG. 10 is a perspective view illustrating an insertion of FIG. 9.

FIG. 9 is a perspective view illustrating a hollow light pipe according to further another embodiment of the present invention; and FIG. 10 is a perspective view illustrating an insertion of FIG. 9.

Referring to FIGS. 9 and 10, a light pipe 700 of the present invention comprises a hollow base pipe 710, and an insertion 720 inserted into the base pipe 710.

The insertion 720 has a structured surface including an array of prisms, and the structured surface of the insertion 720 faces the base pipe 710. Here, a pitch D1 of prisms in a first region B1 of the insertion 720 is wider than a pitch D2 of prisms in a second region B2 of the insertion 720. Therefore, the first region B1 emits a large amount of the light. The insertion 720 may be a film or a pipe.

According to one embodiment of the present invention, the pitch D1 of the prisms in the first region B1 is in the range of about 1.5 mm to 2.5 mm, and the pitch D2 of prisms in the second region B2 is in the range of about 0.5 mm to 1.5 mm. Preferably, the pitch D1 of prisms in the first region B1 is about 1.7 mm to 2.2 mm, and the pitch D2 of prisms in the second region B2 is about 0.8 mm to 1.3 mm.

Figure 11:
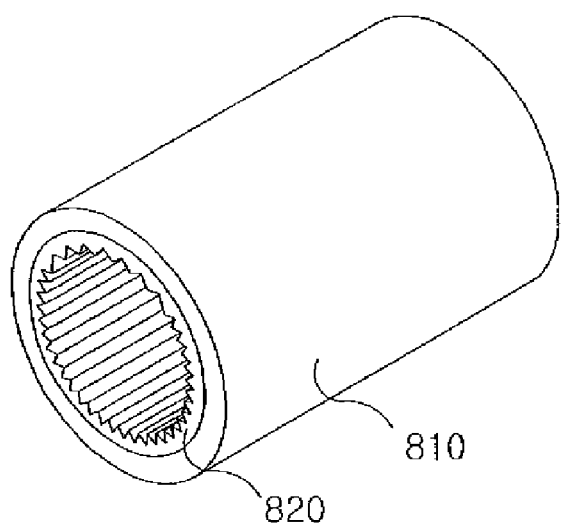
FIG. 11 is a perspective view illustrating a hollow light pipe according to further another embodiment of the present invention.
Figure 12:
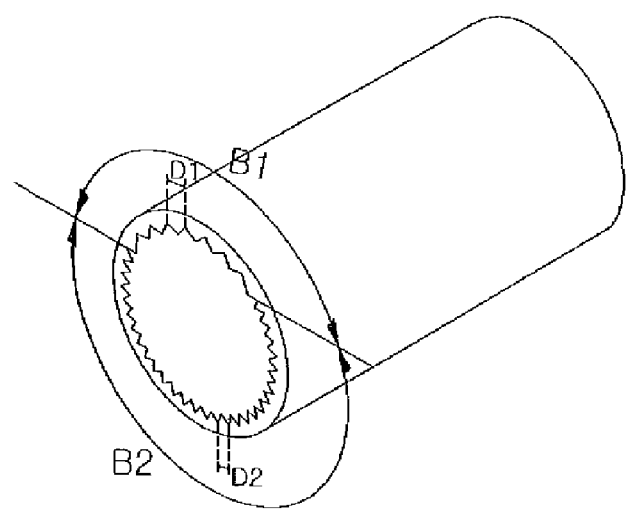
FIG. 12 is a perspective view illustrating an insertion of FIG. 11.

FIG. 11 is a perspective view illustrating a hollow light pipe according to further another embodiment of the present invention; and FIG. 12 is a perspective view illustrating an insertion of FIG. 11.

Referring to FIGS. 11 and 12, a light pipe 800 of the present invention comprises a hollow base pipe 810, and an insertion 820 inserted into the base pipe 810.

The insertion 820 has a structured surface including an array of prisms, and the structured surface of the insertion 820 is disposed toward the inner direction of the light pipe 800. Here, a pitch D1 of prisms in a first region B1 of the insertion 820 is wider than a pitch D2 of prisms in a second region B2 of the insertion 820. Therefore, the first region B1 emits a large amount of the light. The insertion 820 may be a film or a pipe.

According to one embodiment of the present invention, the pitch D1 of the prisms in the first region B1 is in the range of about 1.5 mm to 2.5 mm, and the pitch D2 of prisms in the second region B2 is in the range of about 0.5 mm to 1.5 mm. Preferably, the pitch D1 of prisms in the first region B1 is about 1.7 mm to 2.2 mm, and the pitch D2 of prisms in the second region B2 is about 0.8 mm to 1.3 mm FIG. 13 is an exploded perspective view illustrating a hollow light pipe according to further another embodiment of the present invention.

Figure 13:
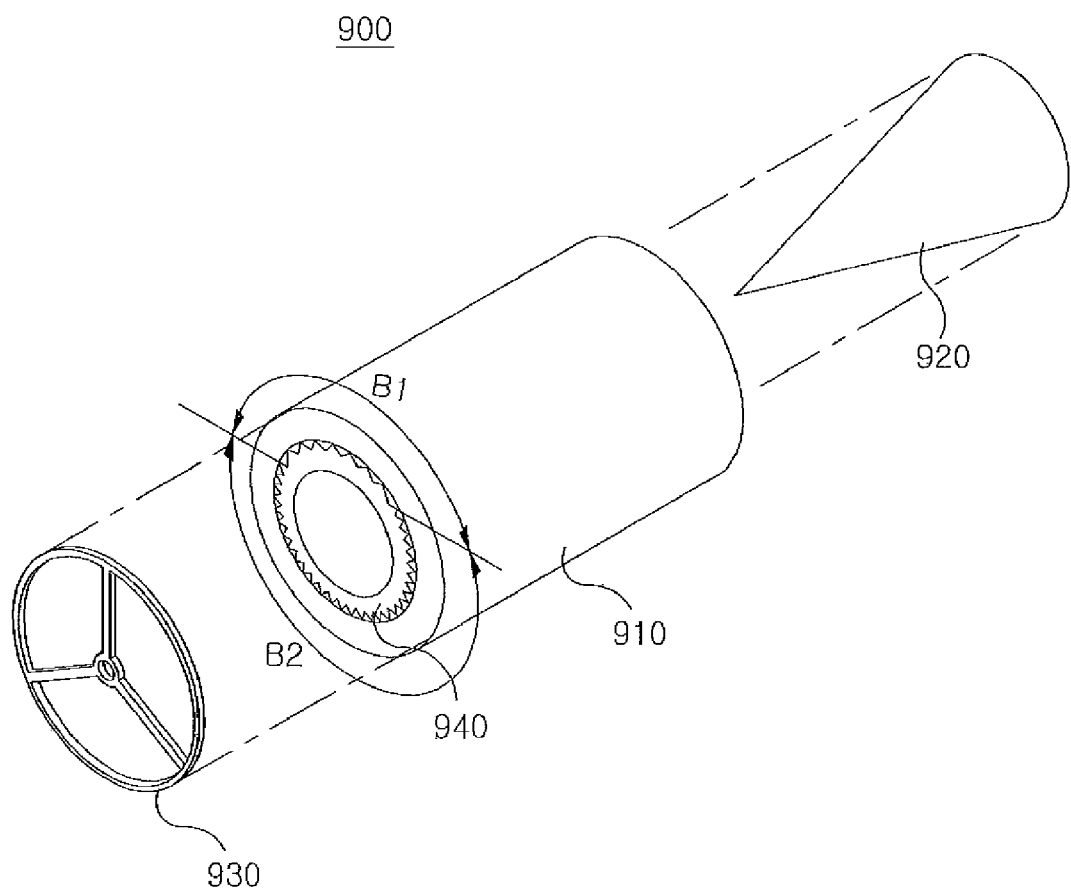
FIG. 13 is an exploded perspective view illustrating a hollow light pipe according to further another embodiment of the present invention.

Referring to FIG. 13, the light pipe 900 of the present invention comprises a hollow base pipe 910, a cone-shaped extractor 920 and an insertion 940. The light pipe 900 may further comprise a supporting body 930 which is connected to an edge part of the cone-shaped extractor 920.

The base pipe 910 has substantially smooth surfaces, and may be made up of a polymer which includes at least one of polycarbonate (PC), polymethyl methacrylate (PMMA), acryle, polypropylene, polystyrene, and polyvinyl chloride.

The insertion 940 has a structured surface including an array of prisms, and is inserted in the base pipe 910. Here, a pitch of prisms in a first region B1 of the insertion 940 is wider than a pitch of prisms in a second region B2 of the insertion 940. Therefore, the first region B1 emits a large amount of the light. The insertion 940 may be a film or a pipe.

According to one embodiment of the present invention, the pitch of the prisms in the first region B1 is in the range of about 1.5 mm to 2.5 mm, and the pitch of prisms in the second region B2 is in the range of about 0.5 mm to 1.5 mm. Preferably, the pitch of prisms in the first region B1 is about 1.7 mm to 2.2 mm, and the pitch of prisms in the second region B2 is about 0.8 mm to 1.3 mm.

The cone-shaped extractor 920 is inserted to inside the insertion 940, and reflects the light. The length of the extractor 920 may be same as or shorter than that of the base pipe 910.

The extractor 920 may be manufactured by applying Ag on a sheet made of SUS, Brass, Al, PET, etc., and coating it with Ti to prevent the thermal deterioration caused by heat absorption.

Alternatively, the extractor 920 may be obtained by dispersing micro-pores capable of scattering light in a resin sheet such as PET. Thus prepared sheet may be used as the extractor by inserting the sheet rolled as cone shape to inside the base pipe 910.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A hollow light pipe, comprising:
   an inner-surface including a linear array of prisms, including a plurality of prisms in a first light transmissive region of the hollow light pipe and a plurality of prisms in a second light transmissive region of the hollow light pipe; and
   a substantially smooth outer-surface,
   wherein a pitch of one of the plurality of prisms in the first light transmissive region is wider than a pitch of one of the plurality of prisms in the second light transmissive region for increasing a brightness of the first light transmissive region, and
   wherein the plurality of prisms in the first light transmissive region have a common shape, and the plurality of prisms in the second light transmissive region have a common shape.

2. The hollow light pipe of claim 1, wherein the pitch of the one of the plurality of prisms in the first light transmissive region is in the range of about 1.5 mm to 2.5 mm, and the pitch of the one of the plurality of prisms in the second light transmissive region is in the range of about 0.5 mm to 1.5 mm.

3. The hollow light pipe of claim 1, wherein the inner-surface substantially has a cross-section of a polyhedron-shape or a circular-shape.

4. The hollow light pipe of claim 1, further comprising diffusive particles disposed on the outer surface.

5. The hollow light pipe of claim 1, further comprising a film having a plurality of scattering patterns and disposed outside or inside the hollow light pipe.

6. The hollow light pipe of claim 1, further comprising:
   a reflector reflecting a light, disposed inside or outside the hollow light pipe, and facing the first light transmissive region.

7. The hollow light pipe of claim 6, wherein the inner surface includes a smooth surface, and the reflector is disposed on the smooth surface.

8. The hollow light pipe of claim 1, further comprising a cone-shaped extractor disposed inside the hollow light pipe to reflect a light.

9. A hollow light pipe, comprising:
   a hollow base pipe; and
   an insertion inserted into the base pipe and having a structured surface including an array of prisms, including a plurality of prisms in a first light transmissive region of the hollow light pipe and a plurality of prisms in a second light transmissive region of the hollow light pipe, wherein
   a pitch of one of the plurality of prisms in the first light transmissive region is wider than a pitch of one of the plurality of prisms in the second light transmissive region for increasing a brightness of the first light transmissive region, and
   the plurality of prisms in the first light transmissive region have a common shape, and the plurality of prisms in the second light transmissive region have a common shape, and
   both the one of the plurality of prisms in the first light transmissive region and the one of the plurality of prisms in the second light transmissive region face the hollow base pipe.

10. The hollow light pipe of claim 9, further comprising a cone-shaped extractor disposed inside the insertion to reflect a light.

11. The hollow light pipe of claim 10, further comprising a supporting body connected to an edge part of the cone-shaped extractor to hold the cone-shaped extractor.

12. The hollow light pipe of claim 9, wherein the insertion is a film or a pipe.

13. The hollow light pipe of claim 1, wherein both the one of the plurality of prisms in the first light transmissive region and the one of the plurality of prisms in the second light transmissive region are disposed toward inner direction of the hollow light pipe.

14. A hollow light pipe, comprising:
   a hollow base pipe; and
   an insertion inserted into the base pipe and having a structured surface including an array of prisms, including a plurality of prisms in a first light transmissive region of the hollow light pipe and a plurality of prisms in a second light transmissive region of the hollow light pipe,
   wherein a pitch of one of the plurality of prisms in the first light transmissive region is wider than a pitch of one of the plurality of prisms in the second light transmissive region for increasing a brightness of the first light transmissive region,
   wherein the plurality of prisms in the first light transmissive region have a first common shape, and the plurality of prisms in the second light transmissive region have a second common shape, and
   wherein both the one of the plurality of prisms in the first light transmissive region and the one of the plurality of prisms in the second light transmissive region are disposed toward an inner direction of the hollow light pipe.

15. The hollow light pipe of claim 14, further comprising a cone-shaped extractor disposed inside the insertion to reflect a light.

16. The hollow light pipe of claim 15, further comprising a supporting body connected to an edge part of the cone-shaped extractor to hold the cone-shaped extractor.

17. The hollow light pipe of claim 14, wherein the insertion is a film or a pipe.

18. The hollow light pipe of claim 14, wherein
the pitch of the one of the plurality of prisms in the first light transmissive region is in the range of about 1.5 mm to 2.5 mm, and the pitch of the one of the plurality of prisms in the second light transmissive region is in the range of about 0.5 mm to 1.5 mm.

19. The hollow light pipe of claim 14, wherein
the pitch of the one of the plurality of prisms in the first light transmissive region is in the range of about 1.7 mm to 2.2 mm, and the pitch of the one of the plurality of prisms in the second light transmissive region is in the range of about 0.8 mm to 1.3 mm.

20. The hollow light pipe of claim 1, wherein the plurality of prisms in the first light transmissive region have a same pitch and the plurality of prisms in the second light transmissive region have a same pitch.

21. The hollow light pipe of claim 9, wherein the plurality of prisms in the first light transmissive region have a same pitch, and the plurality of prisms in the second light transmissive region have a same pitch.

22. The hollow light pipe of claim 14, wherein the plurality of prisms in the first light transmissive region have a same pitch, and the plurality of prisms in the second light transmissive region have a same pitch.

\* \* \* \* \*